May 7, 1940. J. O. BOEHME 2,200,019
HAND GUARD
Filed March 10, 1939 2 Sheets-Sheet 1
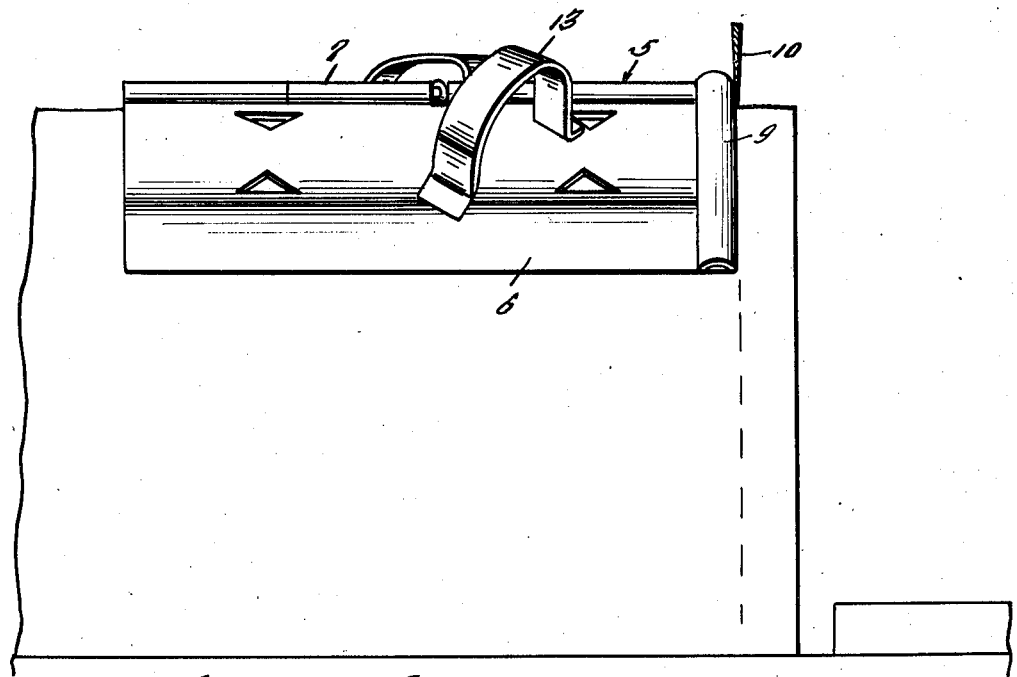
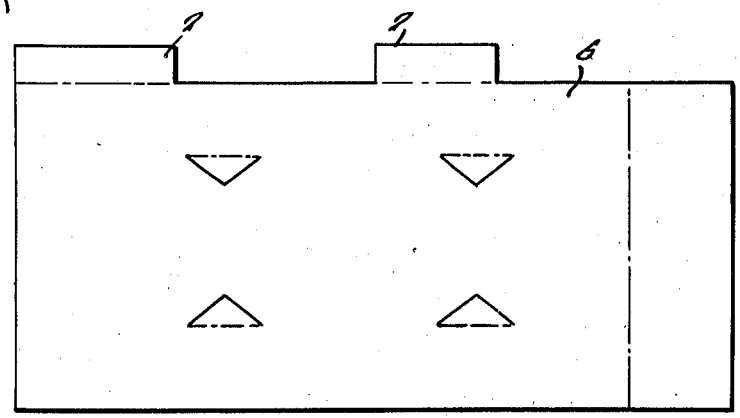
Inventor
J. O. Boehme
By Clarence A. O'Brien
and Hyman Berman
Attorneys May 7, 1940.  J. O. BOEHME  2,200,019
HAND GUARD
Filed March 10, 1939  2 Sheets-Sheet 2
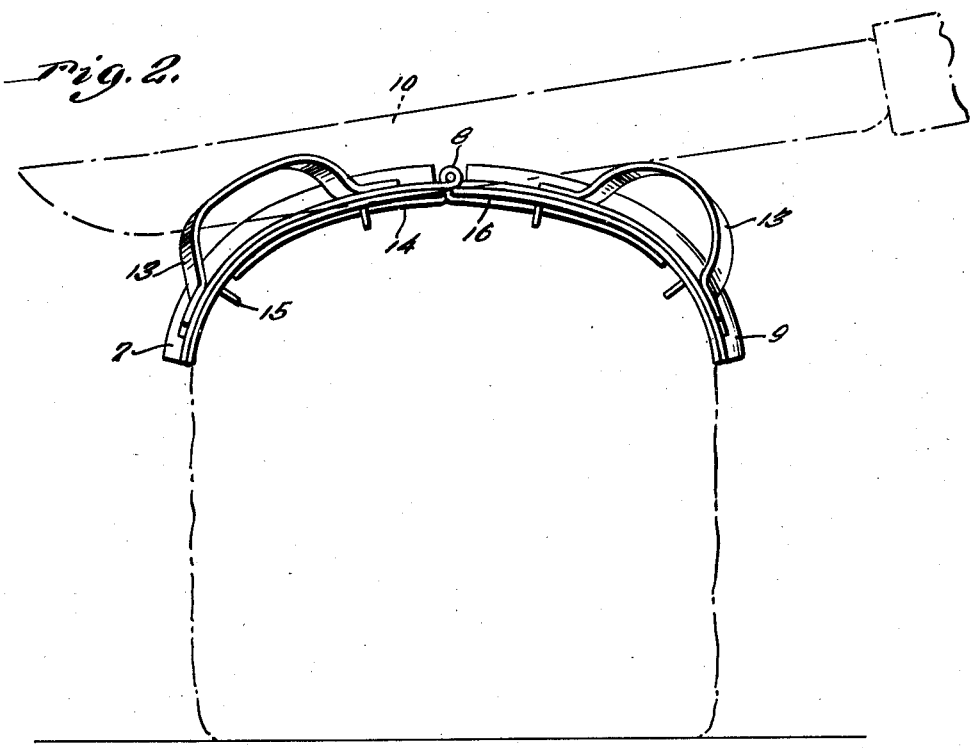
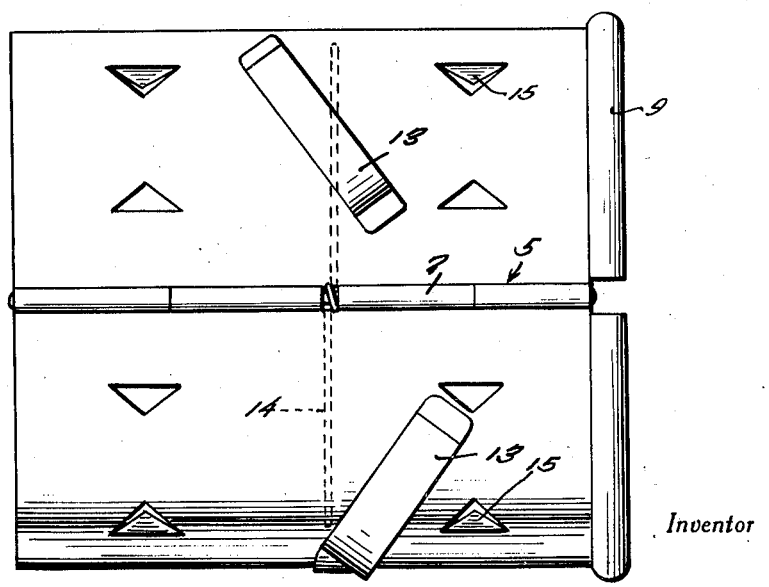
Inventor
J. O. Boehme
By Clarence A. O'Brien
and Hyman Berman
Attorneys Patented May 7, 1940

2,200,019

UNITED STATES PATENT OFFICE 2,200,019

HAND GUARD

John O. Boehme, Washington, N. J.

Application March 10, 1939, Serial No. 261,063

1 Claim. (Cl. 146—150)

The invention relates to a hand guard especially adapted for holding articles such as bread, meat, fruit and the like while being sliced or cut, and has for the primary object the provision of a device of this character which will be heat resisting so that hot articles may be readily handled and which is so constructed as to be operable within a person's hand whereby the closing of the hand brings about gripping of the article by the device so that said article will be firmly held from slipping and also acts to guard or protect the hand from the knife when cutting the article and may be employed as a guide for guiding the movement of the knife through the article gripped by said device.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a side elevation partly in section illustrating a hand guard shown applied to an article and a knife engaging therewith.

Figure 2 is an end elevation illustrating the device with the knife associated therewith and an article gripped by said device.

Figure 3 is a top plan view of the device.

Figure 4 is a plan view illustrating one of the sections of the device.

Figure 5 is a plan view illustrating a spring for acting on the sections of the device to urge said sections toward each other or into gripping position.

Referring in detail to the drawings, the numeral 5 indicates in entirety the holder and is shown applied to a loaf of bread for the purpose of holding the bread by one hand while the other hand is used for slicing the bread with a knife, one edge of the guard acting to guide the movement of the knife if desired.

The hand guard 5 includes a pair of elongated metallic plates 6 each arcuately curved transversely thereof and have formed on adjacent edges hinge barrels 7 to receive a hinge pin 8. One end of each section has formed thereon a rolled flange 9, the flanges coacting with each other in forming a guide for a knife as illustrated at 10. The rolled flanges 9 also will tend to prevent the knife blade while cutting the article to which the device is applied from slipping onto the plates and coming in contact with the operator's hand when grasping said plates.

Loop-shaped elements 13 arranged at an angle to each other are secured on the outer faces of the plates 6 and act as finger and thumb stalls for the thumb and certain fingers of the hand of the operator. A leaf spring 14 is secured to the inner faces of said plates and normally acts to urge said plates apart so that it is necessary for the operator when handling the device to urge or force the plates toward each other to assume gripping position. The movement of the plates toward each other can be easily accomplished by a closing movement of the hand.

Tines 15 are struck from the plates for biting into the article as said plates are forced onto the article by the closing action of the hand of the operator so as to prevent the plates from slipping on the article.

Each plate has secured to its inner face a sheet of heat-resisting material 16 for the purpose of preventing the heat from the article from being transmitted to the hand of the operator.

In use, the device is arranged within the palm of the left hand of the operator with the thumb and certain fingers extending through the elements 13. The operator then positions the device over the article and with a closing movement of the hand forces the tines into the article thereby obtaining a firm grip on the article. The article may then be safely cut through the use of the knife in the other hand of the operator and further the movement of the knife through the article may be guided by the rolled flanges 9.

It is believed that the foregoing description, when taken in connection with the drawings will fully set forth the construction and advantages of this invention to those skilled in the art to which such device relates, so that further detailed description will not be required.

Having thus described the invention, what I claim is:

A hand guard comprising a pair of elongated rigid plates having struck therefrom tines, thumb and finger stall forming elements secured on said plates, a hinge connecting the adjacent longitudinal edges of said plates whereby on a closing action of a person's hand said plates will be moved in the direction of each other for forcing the tines into an article, a spring acting on said plates for normally urging said plates apart, a rolled flange formed on one end of each of said plates in longitudinal alignment with each other to form a knife guide, and a sheet of heat resisting material secured to the inner face of each of the plates.

JOHN O. BOEHME.